Patented Feb. 11, 1947

2,415,556

UNITED STATES PATENT OFFICE 2,415,556

1,3,5-TRIAZINYL-PHENYL-SULFIDES CARRYING AN ARSENIC RADICAL

Ernst A. H. Friedheim, New York, N. Y.

No Drawing. Application October 1, 1942, Serial No. 460,412

10 Claims. (Cl. 260—242)

The present invention relates to therapeutically active, new, asymmetric triazinyl-phenyl-sulfides carrying an arsenic radical and has particular relation to triazinyl-phenyl-sulfides in which the phenyl-group carries an arsenic radical of the type described hereinafter.

The compounds according to this invention correspond to the general formula (I) 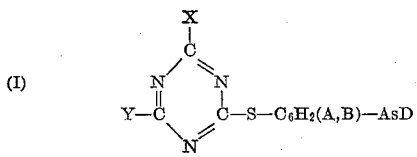

wherein $C_6$ is a benzene ring, X and Y may be equal or different and represent halogen or the residue of any inorganic or organic, aliphatic or cyclic, isocyclic or heterocyclic, monocyclic or polycyclic molecule containing an active hydrogen atom capable of reacting with a cyanuric halide with elimination of hydrogen halide. X and Y may be, f. e., selected from a first group consisting of Cl, Br, I, F, H, OH, O-alkyl, O-acyl, —NH$_2$, —NH-alkyl, —N-alkyl$_2$, —NH-acyl, —NH—NH$_2$, —NH—NH-alkyl, —N-alkyl—NH$_2$, —N-alkyl—NH-alkyl, —NH—NH-acyl, —N-acyl—NH$_2$, —N-acyl—NH-acyl, —NH-aryl, —NH—NH-aryl, —NH(CH$_2$)$_n$CONH$_2$, —NH(CH$_2$)$_n$NH$_2$, —NH(CH$_2$)$_n$NH-alkyl, —NH(CH$_2$)$_n$N-dialkyl, —NH(CH$_2$)$_n$OH,

—NHCH$_2$CHOHCH$_2$OH, —NHOH, —NHCN,

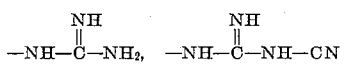

residues of cyanamide derivatives, residues of substituted guanidines, amino-derivatives of carbohydrates, particularly amino-derivatives of monosaccharides, such as glucose amine, SH, substituents of the type —S—R wherein R stands for any aliphatic or cyclic group capable of carrying a —SH group such as thioglycolic acid and thiophenol, alkyl radicals and their substitution products, and isocyclic or heterocyclic hydrocarbon radicals, which may be monocyclic or polycyclic, and their substitution products, such as O-aryl groups, substituted aryl radicals, such as those corresponding to the formula

—NH—C$_6$H$_2$(A,B)—E,

—NH—NH—C$_6$H$_2$(A,B)—E wherein A and B may represent equal or different substituents defined further below, and E may be in ortho-, meta- or paraposition with respect to the —NH— or —NH—NH-group and may, f. e., represent a radical selected from the group consisting of —COOH, —SO$_3$H, —SO$_2$NH$_2$—AsO$_3$H$_2$, —AsO, AS=S, —AS=halogen$_2$. X and/or Y may also stand for substituted sulfur-aryl radicals of the formula —S—C$_6$H$_2$(A,B)—AsD or for 1,3,5-triazine groups or residues of triazine derivatives, and said radicals and triazine groups or derivatives may be linked directly or indirectly to the ring carbon atoms of the first triazine ring. In the latter case, the link between the above mentioned —S-aryl-Me radical and the triazine ring carbon may be formed by a cyclic or aliphatic amine radical, f. e. by an —NH-aryl, —NH-alkyl, —NH—NH-aryl, or —NH—NH-alkyl radical. The link between the first and the substituting triazine ring may be formed by an —NH—, —NH—NH— group or an aliphatic or cyclic diamine, f. e. of the formula —NH—C$_6$H$_4$—NH— or —NH—CH$_2$—CH$_2$—NH—.

The radicals A and B may be the same or different and selected from the group consisting of H, OH, O-alkyl, O-acyl, —NO$_2$, —NH$_2$, —NH—NH$_2$, —NH-acyl, —NH-alkyl, —N-alkyl$_2$, alkyl and halogen.

D is selected from the group consisting of O$_3$H$_2$, O, S, halogen, radicals of the type (S—R)$_2$ wherein R is an organic radical capable of carrying an SH-radical (such sulfur-containing reactants are, f. e., thioglycolic acid, cysteine, glutathione and thiophenol), and a triazine-sulfur-phenyl-arsenic radical of the formula

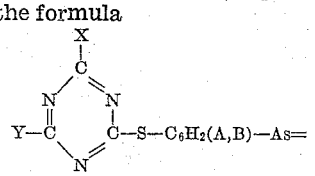

I have found that compounds embodying this invention may be prepared by reacting diazobenzene arsonic acids with a 1,3,5-triazine derivative carrying at least one sulfhydril group or a tautomeric structure, for example according to the following formulas:

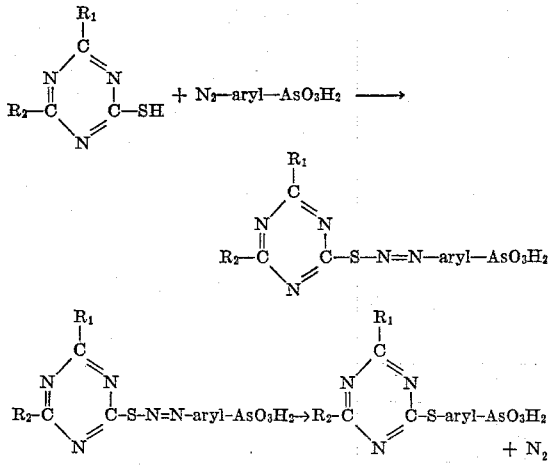

The sulfur-containing triazine derivatives used for preparing the compounds according to this invention may be prepared according to known methods by reacting a triazine derivative containing at least one halogen linked to a triazine ring carbon, with alkali sulfide or sulfhydrate. $R_1$ and $R_2$ may be the same or different, for example halogen atoms or $NH_2$ radicals. This method allows for the ready preparation of a great variety of suitable thiotriazines. In certain cases it may be of advantage to prepare thiotriazines, such as thioammeline, by direct ring formation, e. g., by reactions involving the cyan radical, such as dicyanamide, biguanidine, thiocyanide.

The compounds embodying the present invention may be also prepared by reacting a thiophenol-arsonic acid with a triazine derivative carrying at least one halogen attached to a triazine ring carbon atom or by reacting a triazine SH-compound with an arsenic-free aromatic diazo compound carrying a substituent that can be replaced by an arsenic-radical after the formation of a triazine aryl sulfide.

The sulfides according to this invention may be oxidized to the corresponding sulfoxides and sulfones.

It is to be understood that in the appended claims the term "amino" radical or group is used to include —$NH_2$ radicals as well as substituted amino radicals.

*Example I.*—21.7 g. of arsanilic

acid are dissolved in 100 cc. of an 8% aqueous solution of NaOH. 7 g. of sodium nitrite are added, and the clear alkaline solution is run in a thin stream with stirring and cooling into a mixture of 27.5 cc. of concentrated hydrochloric acid (D=1.19) and 200 g. of ice. The solution is allowed to stand for 20 minutes, and is then run with rapid stirring into 600 cc. of an aqueous solution containing 14.3 g. of thioammeline corresponding to the formula

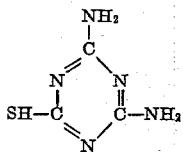

and 33.4 g. of anhydrous sodium carbonate at a temperature of 70° C. Stirring is continued for 2 hours. After this time the reaction mixture fails to give a color reaction with R-salt. The reaction mixture, which has taken up a yellowish color, is filtered to remove a grayish precipitate, the filtrate is boiled for ½ minute with copper powder, boneblacked and filtered. The filtrate is acidified with hydrochloric acid, using congo red as an indicator. A flocculent, viscous precipitate is formed and disappears during the procedure. The solution is heated with a trace of copper powder and charcoal, and filtered. On addition of sodium acetate up to a reaction where congo red takes up a faintly blue tint, a white precipitate is formed, which is filtered off and washed with dilute acetic acid, water and alcohol. For purification, the precipitate is dissolved in 12 times its weight of water containing a 20% excess of the calculated amount of bicarbonate of soda. The alkaline solution is boneblacked and filtered. With warming and stirring, the solution is acidified by adding slowly 50% acetic acid in such a way that the precipitate formed is redissolved. The warm solution is boneblacked and filtered. On standing it yields a white, crystalline precipiate of [2-4-diamino-1,3,5-triazine-(6)]-p-thiophenyl arsonic acid, which is recrystallized out of hot dilute acetic acid. The reaction takes place according to the general scheme shown above in connection with the reaction between diazobenzene arsonic acids and 1,3,5-triazine derivatives carrying at least one sulfhydril group, and the resulting compound corresponds to the formula

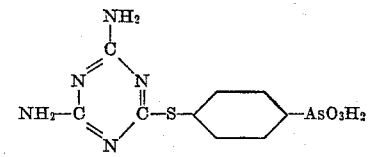

The compound is soluble in aqueous bicarbonate of soda and in an excess of dilute hydrochloric acid. The solution in hydrochloric acid forms on addition of stannous chloride and hydroiodic acid, a yellow flocculent precipitate of bis [2,4-diamino-1,3,5-triazine-(6)]-p,p'-thioarsenobenzene corresponding to the formula

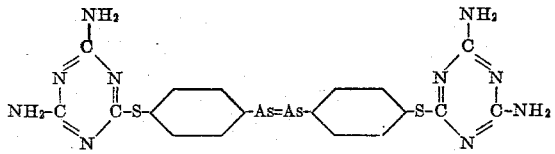

A trace of the substance fused with sodium metal gives a deep purple tint on addition of an aqueous solution of sodium nitroprussate. A concentrated solution in warm hydrochloric acid (D= 1.19) yields on cooling a white crystalline hydrochloride. A solution of the compound in warm hydrochloric acid yields on treatment with $SO_2$ in the presence of HI a white crystalline precipitate of the hydrochloride of [2-4-diamino-1,3,5-triazine-(6)] - p - thiophenyldichlorarsine which may be readily transformed on treatment with cold dilute ammonia into [2,4-diamino-1,3,5-triazine-(6)]-p-thiophenyl arsinoxide.

*Example II.*—2,4,6 - amino - chloro - sulfhydro-1,3,5-triazine of the formula

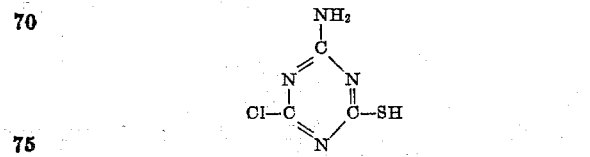

is prepared by reacting cyanuric chloride at 0° C. in dry ether solution with dry ammonia, and by further reacting the amino-dichloro-triazine thus obtained at 30° C. in aqueous solution with NaHS. Following a procedure in all respects analogous to that described in Example I, but replacing thioammeline by 2,4,6-amino-chloro-sulfhydro-1,3,5-triazine, and arsanilic acid by m-amino-phenylarsonic acid, a reaction product consisting of [2-amino-4-chloro-1,3,5-triazinyl-(6)]-m-thiophenylarsonic of the formula

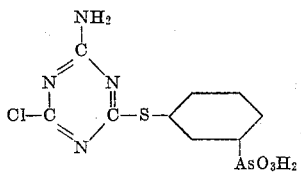

is obtained. On refluxing with diethyl amine, this compound is converted into [2,4-amino-diethylamino - (6)] - m - thiophenylarsonic acid. The compound forms a white powder, soluble in aqueous alkali and in an excess of dilute, warm hydrochloric acid. It is insoluble in acetone and chloroform.

*Example III.*—An alkaline solution of 2,4,6-amino-methoxy-sulfhydro-1,3,5-triazine of the formula

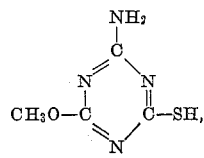

prepared by condensation of dicyandiamide with thioacetic acid, is reacted with 3-diazo-4-nitro-benzene-arsonic acid in a procedure analogous in all respects to that described in Example I. The resulting product is a [2,4-amino-methoxy-1,3,5-triazine-(6)]-3-thio-4-nitro-phenylarsonic acid corresponding to the formula

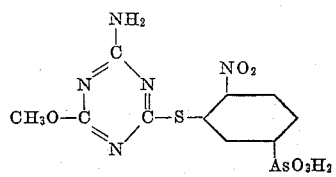

a yellowish crystalline powder, soluble with brown color in alkali, with slight yellow color in dilute, hot hydrochloric acid, and insoluble in chloroform and ether.

*Example IV.*—A solution containing 21.8 g. of thiophenolarsonic acid (prepared according to classical methods from diazobenzene arsonic acid and potassium xanthogenate) and 12 g. of NaOH dissolved in 200 g of water, is run, drop by drop, with stirring and cooling into a fine suspension of 20.0 g. of cyanuric chloride in 200 cc. of water. After 2 hours of continuous stirring, the reaction mixture contains no free SH-group (as tested with sodium nitroprussate). The white precipitate formed on acidification with HCl is filtered off, and decanted with water and acetone. For purification it is redissolved in 10 times its weight of water and the necessary amount of sodium bicarbonate to bring about a slightly alkaline reaction. The solution is boneblacked, filtered, and yields on acidification with HCl, a white precipitate of [2,4 - dichloro - 1,3,5-triazine-(6)]-p-thiophenyl arsonic acid corresponding to the formula

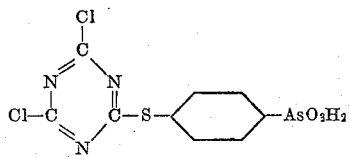

The compound is soluble in alkali, insoluble in cold, dilute hydrochloric and acetic acid, and insoluble in alcohol and ether. One or both of its halogen atoms may be substituted by treatment with ammonia or an alkylamine.

Further compounds embodying the present invention, in which X and/or Y stands for a radical other than those described in the above examples, may be obtained, f. e., by first preparing an X—Y-triazine compound, in which at least one carbon atom of the triazine ring carries a halogen, and reacting such triazine compound with a suitable phenylarsonic acid derivative, such as thiophenol-arsonic acid, or by treating said X—Y-triazine-halogen derivative with alkali sulfhydrate and reacting the thiotriazine thus obtained with an arsenic-containing derivative of diazobenzene. These reactions between these X—Y-triazine-halogen compounds or the X—Y-triazine-SH-compounds and the phenyl-arsonic acid derivatives may be carried out in a manner analogous to that described in the above examples.

Furthermore, triazine derivatives embodying the present invention may also be obtained by reacting a triazine-sulfur-phenyl-arsenic compound corresponding to the general formula

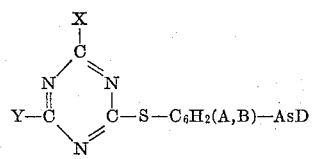

and containing as X and/or Y active groups, f. e., halogens or NH2-groups, with any compounds capable of combining with or replacing X and/or Y. A compound of the formula

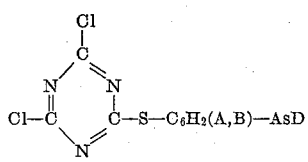

may be reacted, for example, with thiophenol-arsonic acid or arsanilic acid to replace one or both Cl atoms.

Compounds corresponding to the above general formula I, and carrying S or S-containing radicals linked to the As-atom, may be obtained, f. e., by treating a compound which corresponds to the above general Formula I, and in which the group AsD stands for AsO, with H2S or by reacting an arsonic acid derivative corresponding to Formula I with the thioglycolic acid in the presence of sodium bicarbonate.

Compounds embodying this invention and carrying A, B substituents other than those described in the above examples, may be obtained by a procedure substantially analogous to the procedure described in said examples.

I have further found that by treating a compound corresponding to the general formula

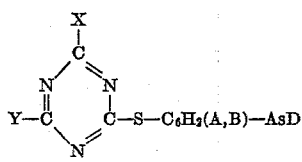

with mild oxidizing agents, such as diluted $H_2O_2$ or diluted nitric acid, the —S— atom is converted into a —SO— or —$SO_2$— radical, thus forming a compound corresponding to one of the following formulas:

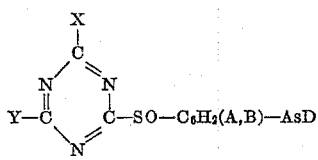

and

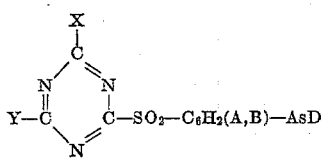

The new compounds according to this invention are adapted to be used as medicinal preparations. They exert a therapeutic action in infectious diseases, such as those caused by certain protozoa and spirochetes, and have a relatively low toxicity.

It will be understood that this invention may be carried out in other specific ways than those herein set forth, and the examples should be, therefore, considered as illustrative and not restrictive within the spirit of the invention as defined in the appended claims.

I claim:

1. A new compound corresponding to the general formula

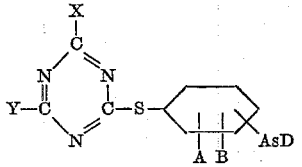

wherein X and Y are selected from the group consisting of halogens and amino radicals, A and B are selected from the group consisting of H, halogen and OH, and —AsD is selected from the group consisting of —$AsO_3H_2$ and its salts, —As=O and —As=S.

2. A new compound corresponding to the formula

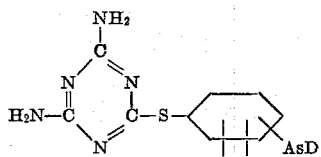

wherein A and B are selected from the group consisting of H, halogen and OH, and —AsD is selected from the group consisting of —$AsO_3H_2$ and its salts, —As=O and —As=S.

3. A process for the preparation of a compound corresponding to the formula

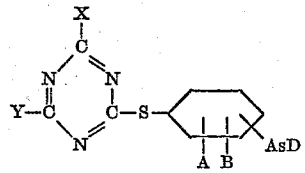

wherein X and Y are selected from the group consisting of halogens and amino radicals, A and B are selected from the group consisting of H, halogen and OH, and —AsD is selected from the group consisting of —$AsO_3H_2$ and its salts, —As=O and —As=S, said process comprising mixing in a liquid indifferent reaction medium a compound of the formula

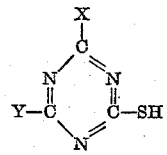

with an arsenic-containing diazobenzene compound of the formula

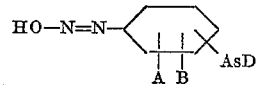

4. A new compound of the formula

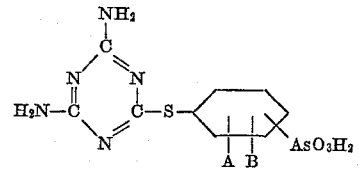

wherein A and B are selected from the group consisting of H, halogen and OH.

5. A new compound of the formula

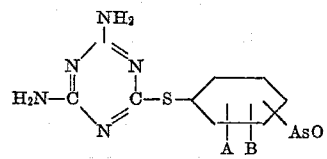

wherein A and B are selected from the group consisting of H, halogen, and OH.

6. A new compound of the formula

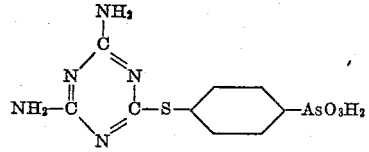

7. A new compound of the formula

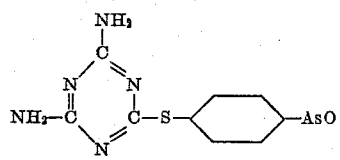

8. A new compound of the formula

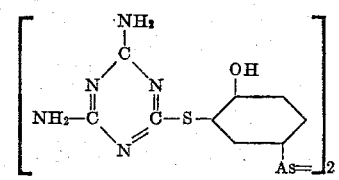

9. A process for the preparation of a compound corresponding to the formula

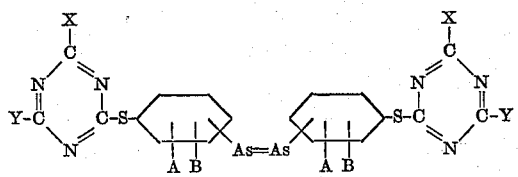

wherein X and Y are selected from the group consisting of halogens and amino radicals, A and B are selected from the group consisting of H, halogen and OH, said process comprising subjecting a compound corresponding to the formula

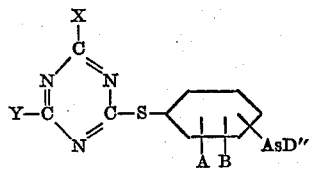

wherein D'' is selected from the group consisting of $-O_3H_2$, $=O$ and $(halogen)_2$, to the action of a reducing agent selected from the group consisting of hypophosphoric acid, stannous chloride in the presence of HJ, and sodium hydrosulfite ($Na_2S_2O_4$).

10. A process for the preparation of a compound of the formula

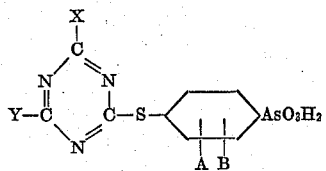

wherein X and Y are selected from the group consisting of halogens and amino radicals, and A and B are selected from the group consisting of H, halogen and OH, said process comprising mixing in a liquid indifferent reaction medium a compound of the formula

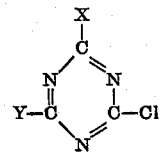

with a thiophenylarsonic acid of the formula

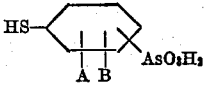

ERNST A. H. FRIEDHEIM.